No. 616,386. Patented Dec. 20, 1898.
V. WISNIEWSKI.
DRIVING GEAR FOR CYCLES.
(Application filed Sept. 17, 1898.)
(No Model.)
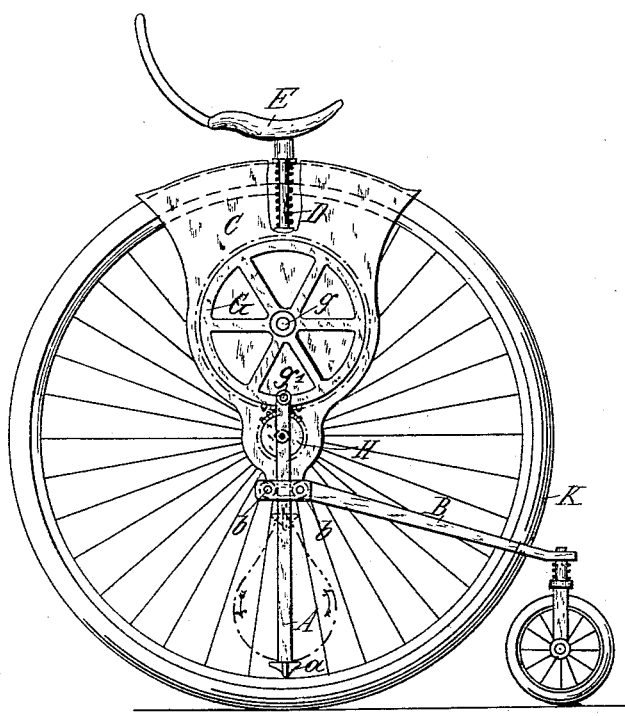
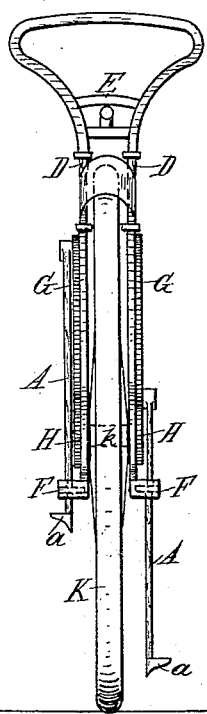

UNITED STATES PATENT OFFICE.

VINCENT WISNIEWSKI, OF BERLIN, GERMANY.

DRIVING-GEAR FOR CYCLES.

SPECIFICATION forming part of Letters Patent No. 616,386, dated December 20, 1898.

Application filed September 17, 1898. Serial No. 691,230. (No model.)

*To all whom it may concern:*

Be it known that I, VINCENT WISNIEWSKI, a subject of the Emperor of Germany, residing at Berlin, Germany, have invented new and useful Improvements in Driving-Gears for Cycles, of which the following is a specification.

This invention relates to an improved cycle and driving-gear for cycles.

The invention chiefly consists in arranging the driving-gear so that the force produced by the feet of the rider always acts on the pedals below the axis of rotation of the driven road-wheel and that the pedals act by means of connecting-rods on toothed wheels engaging with pinions arranged below and secured to the axle of the cycle-wheel. The new gear thus insures a very great stability to the machine, so that it is scarcely possible for the rider to fall and the cycle is completely under control. By this means the new device may be used not only for ordinary cycles, (such as bicycles and tricycles,) but also for a new kind of cycle which may permissibly be called a "monocycle."

In the accompanying drawings, Figure 1 is a side view of a bicycle according to my invention. Fig. 2 is a view on the rear side, the rear wheel being omitted.

Each pedal $a$ is mounted on the end of a rod A. The other end of the rod A is pivoted on a crank-pin $g'$ on a wheel G, supported at $g$ in the frame C of the machine. This wheel G is provided on its circumference with teeth, which will engage the teeth of a pinion H below it, secured to the axle $k$ of the road-wheel K. It will thus be evident that when the rod A, which is guided in the cycle-frame by small rollers $b\,b$ or the like, is caused to reciprocate vertically or substantially vertically the wheel will be rotated, whereby the road-wheel will be caused to rotate through the intermediary of the pinion. The axle $k$ is of course provided at each side of the road-wheel with a pinion H, and the other parts A and G must be also provided on both sides of the cycle.

It is important to arrange the pinion H in the vertical line directly under the toothed wheel, so that the point of application of the force is always below the axle of the road-wheel.

The cycle-frame C consists simply of a plate bent in U shape, on which are supported the toothed wheels G already mentioned. The axle $k$ is supported in the lower part of the plate. There may be provided a pin, on which in that case the hub supporting the pinions would rotate. There may be also connected to the frame-plate a fork B, supporting a small back wheel or a small steering front wheel.

There have already been attempts to construct cycles in which the pedal has been connected to a rod operating like an ordinary connecting-rod the driving-wheel. In such cases, however, the lower point of the connecting-rod has been guided either by ordinary guides or by a series of rods in such manner that the motion of this point took place in a straight line. If, however, as in the present case, the pedal is mounted directly on the lower point of the rod and the latter is guided near the axis of rotation of the road-wheel, the consequence will be that the pedal will be caused to describe an elliptical curve such as shown in dotted lines. This circumstance is of great importance in this invention, for, first, the whole frame of the machine is considerably simplified thereby owing to the suppression of a special rectilinear guide; secondly, the motion of the pedals does not differ substantially from ordinary rotary motion, and, thirdly, which is the most important point, the feet of the rider always (except at the dead-point) have resting-points, one of which is in front of and the other behind the vertical axis of the road-wheel. This circumstance enables the rider to overcome the tendency of the cycle-frame to fall forward or backward, so that the cycle, according to the present invention, may be constructed either as a monocycle or as a so-called "high" cycle, in which case there will be a supplementary small wheel which either does not bear any load or only very little.

The saddle can be mounted by means of springs D on the frame-plate and may also carry the handle-bars. In order to prevent the rider from sliding forward or backward on the saddle and at the same time to enable the legs to move easily up and down, the saddle may be formed with a curve-shaped projection.

Instead of two intermeshing pinions I may of course employ two pinions and an endless chain.

Brake, mud-guards, lamp, and the like can be mounted on the machine in the usual manner.

The rods A can be made out of sheet metal, such as steel-band or other flexible material, in which event the elliptical curve is not fully such as shown; but the rider can modify it by his feet.

Having thus particularly described and ascertained the nature of my invention, I declare that what I claim is—

1. In a cycle the combination of the main wheel, a frame mounted on the axle of said wheel and provided with a guiding-slot, a driving-disk for the main wheel, a pin on said disk, a pitman suspended from said pin, passing through said guiding-slot, and a pedal secured to the lower end of said pitman, substantially as described.

2. In a cycle the combination of the main wheel provided with a gear-wheel on its axle, a frame carrying a seat mounted on said axle and having a guiding-slot provided with rollers, a gear-wheel mounted on said frame and engaging the gear-wheel on the axle, a pin attached to the gear-wheel which is mounted on the frame, a pitman suspended from said pin and passing through the guiding-slot on said frame and between said rollers, and a pedal secured to the lower end of said pitman, substantially as described.

In testimony whereof I have signed my name to this specification in the presence of two subscribing witnesses.

VINCENT WISNIEWSKI.

Witnesses:
C. H. DAY,
HENRY HASPER.